United States Patent
Tsai et al.

(10) Patent No.: US 6,675,683 B2
(45) Date of Patent: Jan. 13, 2004

(54) CUTTER RELEASING MECHANISM FOR DIRECT CONNECTED SPINDLE OF MACHINE TOOL

(75) Inventors: Kun-Kong Tsai, Hsinchu Hsien (TW); Hung-Chieh Huang, Taichung (TW); Chih-Yang Hu, Taichung Hsien (TW); En-Sheng Chang, Taiping (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 199 days.

(21) Appl. No.: 10/052,544

(22) Filed: Jan. 23, 2002

(65) Prior Publication Data

US 2003/0097919 A1 May 29, 2003

(30) Foreign Application Priority Data

Nov. 28, 2001 (TW) .......................................... 9022057 U

(51) Int. Cl.7 ............................. B23C 5/26; B23B 31/10
(52) U.S. Cl. ....................... 83/168; 83/698.11; 409/232
(58) Field of Search .......................... 83/523, 613, 651, 83/698.11, 168, 639.1, 698.17; 409/233, 136, 239 R, 135, 232; 29/434, 460, 527.2, 530, 264, 269, 69.151

(56) References Cited

U.S. PATENT DOCUMENTS

| | | | | |
|---|---|---|---|---|
| 4,884,899 A | * | 12/1989 | Schwartzman | 384/100 |
| 5,120,388 A | * | 6/1992 | Knott | 156/294 |
| 5,420,388 A | * | 5/1995 | Girardin | 219/69.15 |
| 5,487,628 A | * | 1/1996 | Suzuki | 409/135 |
| 6,036,415 A | * | 3/2000 | Sheehan et al. | 409/231 |
| 6,193,451 B1 | * | 2/2001 | .ANG.sberg | 409/23 |
| 6,236,415 B1 | * | 5/2001 | Nozaki et al. | 347/116 |
| 6,238,152 B1 | * | 5/2001 | Fujimoto et al. | 409/233 |
| 6,287,059 B1 | * | 9/2001 | Hashidate et al. | 409/233 |
| 2003/0053876 A1 | * | 3/2003 | Antoun | 409/233 |

* cited by examiner

Primary Examiner—Allan N. Shoap
Assistant Examiner—Ghassem Alie
(74) Attorney, Agent, or Firm—Rabin & Berdo, P.C.

(57) ABSTRACT

Disclosed is a cutter releasing mechanism for direct connected spindle of machine tool comprises a pressured mechanism associated with the action of air and oil pressure serves to improve the function and effect of the cutter releasing mechanism. During releasing the cutter tool, a required actuating force is transmitted to the cutter tool equipped at the front end of the main shaft to perform cutter releasing mission, and clean the cutter with air blow conducted thereto at the moment the cutter is released. The cutter releasing mechanism of the present invention is suitable for both vertical and horizontal combination machinery by minimizing the increased length of the main shaft caused by adding the cutter releasing mechanism so as to alleviate vibration of the shaft working at a high speed.

6 Claims, 3 Drawing Sheets

CUTTER RELEASING MECHANISM FOR DIRECT CONNECTED SPINDLE OF MACHINE TOOL

BACKGROUND OF THE INVENTION

1. Field of the Invention

The present invention relates to a cutter releasing mechanism for direct connected spindle of machine tool, in particular, to a cutter releasing mechanism with a pressured pyramidic block for transmitting a cutter releasing force and cleaning air to the cutter tool equipped at the front end of the main shaft.

2. Description of the Prior Art

In a conventional tool machine, there are two ways for connecting the spindle shaft to the driving motor, i.e. the belt transmission and the gear transmission. In the former way, a large torque loss is wasted during transmission, while in the latter way, it is difficult to overcome the problem of noise and vibration. Direct coupling of the spindle shafts and the driving motor is advantageous at high speed operation with a low cost. However, there are still some technical problems have to be solved. For example Vibration of the machine and its oil container when the shaft is rotating at high speed; how to form an air passage along the shaft for cleaning the cutter when releasing; how to produce and transmit a cutter releasing force; and how to release the cutter by knocking without influencing the shaft life time etc.

Therefore, an invention devoting to palliating aforesaid disadvantages of current practice in the structure of a machine tool is definitely necessary. In view of the foregoing situation, the inventor of the invention herein conducted intensive research based on many years of experience gained through professional engagement in the manufacturing of related products with continuous experimentation and improvement culminating in the development of a cutter releasing mechanism for direct connected spindle of machine tool of the present invention herein.

SUMMARY OF THE INVENTION

It is an object of the present invention to provide a cutter releasing mechanism for direct connected spindle of machine tool which can transmit a cutter releasing force and cleaning air to the cutter equipped at the front end of the main shaft.

It is another object of the present invention to provide a cutter releasing mechanism for direct connected tool machine which can release the cutter by knocking for both vertical and horizontal combination machinery by minimizing the increased length of the main shaft caused by adding the cutter releasing mechanism so as to alleviate vibration of the shaft working at a high speed.

To achieve the above mentioned objects, gist of the present invention is to provide a cutter releasing mechanism comprising a main shaft, a cutter releasing oil container, an oil container base, an oil container lid, an oil container piston, a floating mount cutter base, a fixing nut, a pull rod, a pressured mechanism, and at least one washer for adjusting number of cutters to be equipped.

With this structure, the pressured mechanism associated with the action of air and oil pressure servers to improve the function and effect of the cutter releasing mechanism. During releasing the cutter tool a required actuating force is transmitted to the cutter tool equipped at the front end of the main shaft to perform cutter releasing mission, and clean the cutter with air blow conducted thereto at the moment when the cutter is released.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

Figure 1:
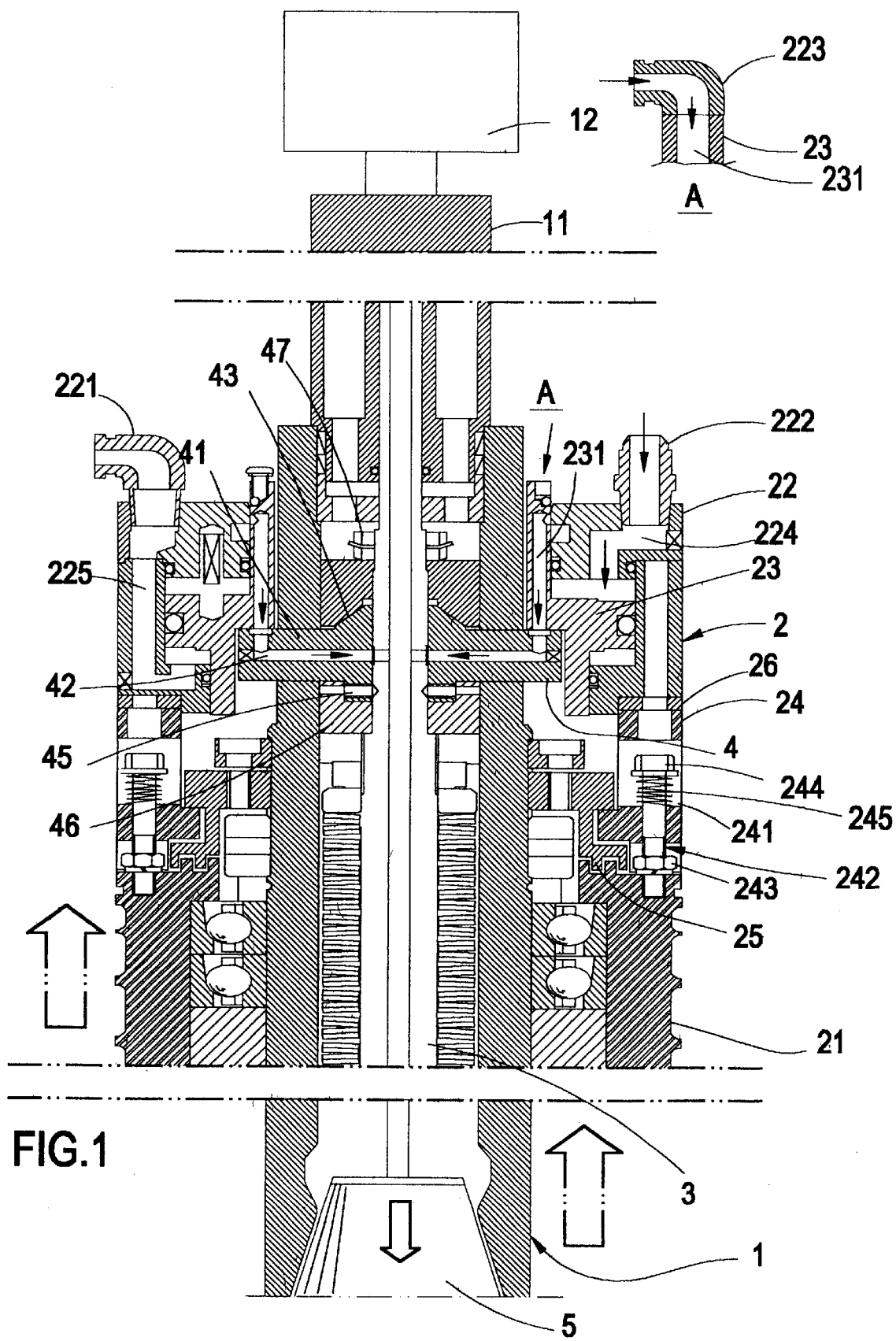
FIGS. 1 and 2 are the cross sectional views of the cutter releasing mechanism for direct connected spindle of machine tool according to the present invention.
Figure 3A:
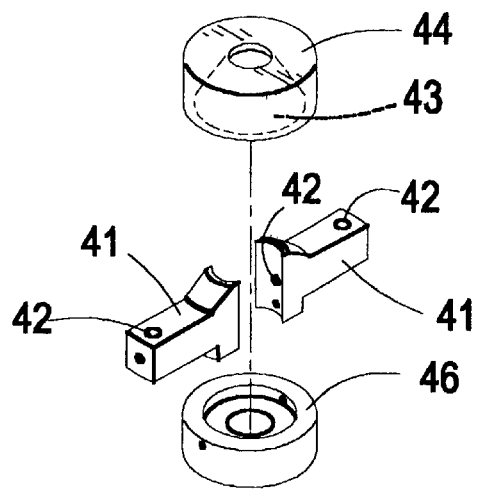
FIG. 3(A) is a three dimensional view of the pyramidic pressured mechanism of the present invention.
Figure 3B:
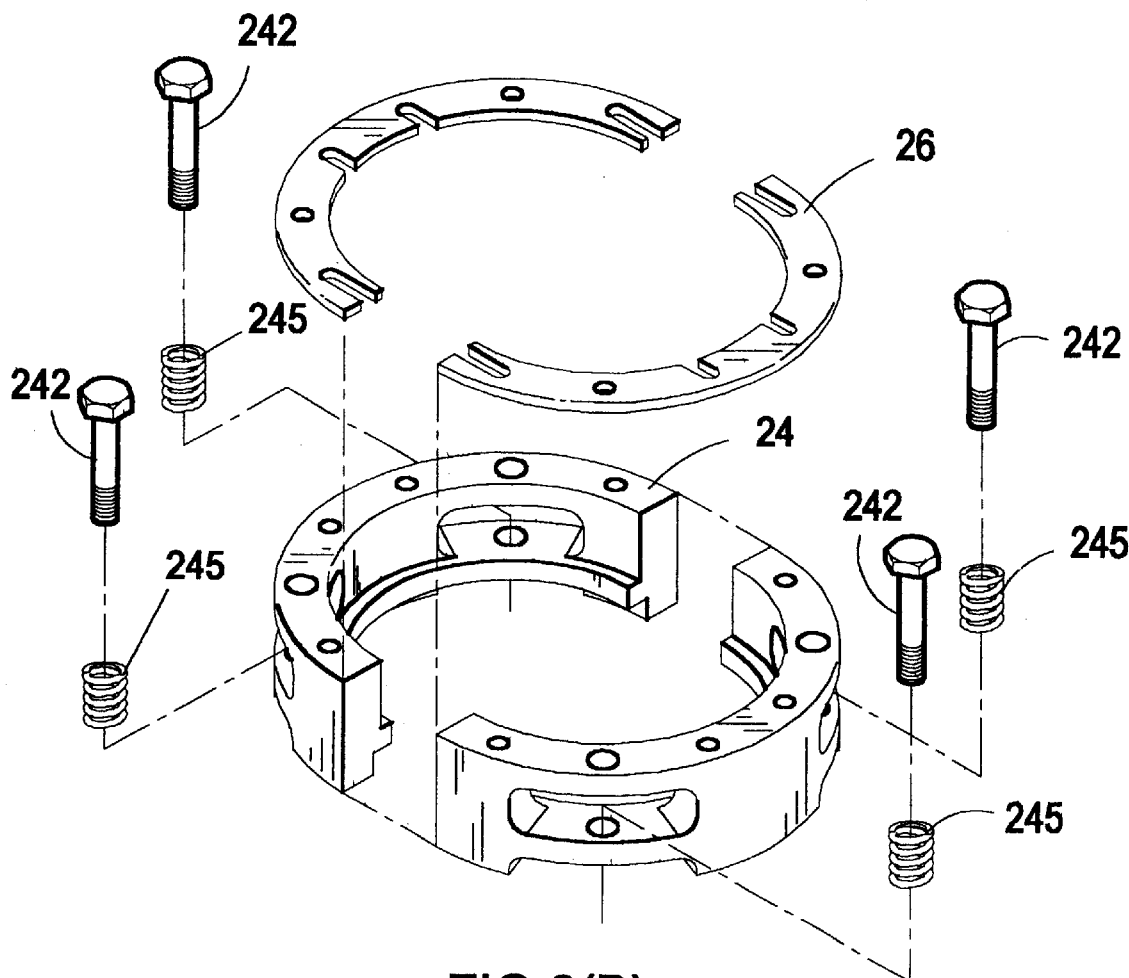
FIG. 3(B) is a three dimensional view of the floating mount cutter base of the present invention.

Referring to FIG. 1 together with FIGS. 3(A) and 3(B), wherein a main shaft 1, a cutter releasing oil container 2, a pull rod 3, and a pressured mechanism 4 are consisted in the present invention. It is observed that the main shaft 1 is directly coupled to the shaft of a driving motor 12 with a shaft coupler 11. The oil container 2 is enclosing over the main shaft 1, the oil container 2 is composed of a base 21, a lid 22, a piston 23, a floating mount cutter base 24 (see FIG. 3B), and a fixing nut 25. A cutter clamping air blow head 221, a cutter releasing oil pressure head 222, and an air blow head 223 are equipped external of the oil container lid 22, and the cutter clamping air blow head 221 and the oil pressure head 222 are respectively connected to a cutter releasing air blow passage 224 and an oil pressure passage 225 both formed under the oil container lid 22. The piston 23 is fitted under the lid 22, and another air blow passage 231 is formed within the piston 23. The air blow passage 231 is communicating with the air blow head 223. A plurality of brake sections 241 are formed along the trunk of the floating mount cutter base 24, and the truck itself is bolted to the oil container base 21 with several pairs of screw blot 242 and nut 243. Between the unthreaded portion of the screw bolt 242 and its bolt head 244 there is provided a compressed spring 245. The aforesaid unthreaded portion of the screw bolt 242 is situated at the brake section 241 of the floating mount cutter base 24. The fixing nut 25 is screwed onto the main shaft 1 and engaged with the floating mount cutter base 24. The pull rod 3 is passing longitudinally through the main shaft 1 and is gripping a cutter tool 5 at its lower end thereof. The pressured mechanism 4 further includes two pressured pyramidic blocks 41 with its one end conjoined to the circumference of the pull rod 3 simmetrically with each other, while the other end of each block 41 is emerged out of the main shaft 1. Each pressured pyramidic block 41 is further provided with another air blow passage 42 communicating to its both ends. This air blow passage 42 is also communicating with the air blow passage 231 formed in the piston 23. Besides, a conical guide protion 43 is formed at the upper part of each pressured pyramidic block 41, each conical guide protion 43 has an upper pressure ring 44 at its upper part, while its lower part is engaged to a lower pressure ring 46 with a fixing screw 45. The fixing screw 45 also can secure the two pressured pyramidic blocks 41 onto the pull rod 3, on the other hand, the upper and lower pressure rings 44, 46, and both pressured pyramidic blocks 41 are mutually tightened by means of an engagement nut 47 which being screwed onto the pull rod 3. An adjusting washer 26 for adjusting number of cutters for said cutter tool is interposed between the floating mount cutter base 24 and the oil container lid 22.

Figure 2:
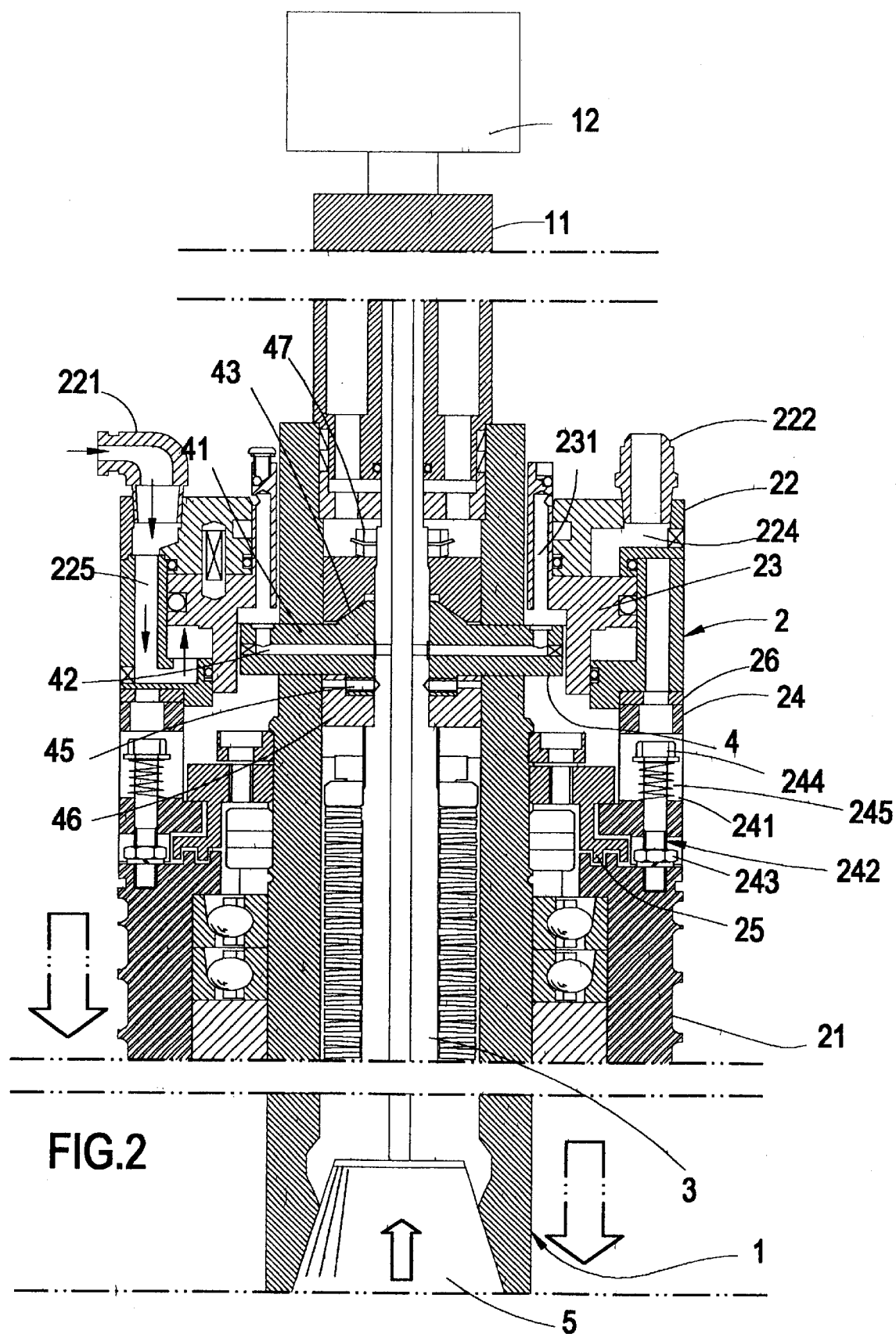

Referring to FIG. 1 and FIG. 2 simultaneously, in operation of the present invention, at first tightening firmly the upper pressure ring 44, two pressured pyramidic blocks 41 and the lower pressure ring 46 to the pull rod 3 by screwing the engagement nut 47 such that the pressured mechanism 4 formed of above mentioned three components 44, 41 and 46 is conjoined as if integrally made of one piece with the pull rod 3, and positioning this combined structure at a definite angle with the fixing screw 45 thereby providing multi-functions thus for the piston 23 to transmit a force for releasing the cutter tool, and furthermore, providing the air blow passages 231, 42, and an interface for the floating mount cutter base 24. The operation of the present invention is successively carried out in the order: After the position of the main shaft 1 is fixed in a definite angle for releasing the cutter tool a high pressure oil flow is ejected from the oil pressure head 222 so as to actuate the piston 23 in the oil container 22. During downwards stroke of the piston 23, it contacts both pressured pyramidic blocks 41 thereby achieving connection of the air blow passages 231 and 42. Then by utilizing the bolt 242 as a guide track, the floating mount cutter base 24 is raised up and the spring 245 is compressed thereby causing the cutter base 24 to hook onto the fixing nut 25. Herein both pressured pyramidic blocks 41 of the pressured mechanism 4 are able to impart a powerful force to the piston such that a disc spring 13 installed in the main shaft 1 is compressed to release the cutter tool 5, and the releasing force produced by the pull rod 3 is well controlled by an adjusting washer 26 to maintain an appropriate separating distance of the cutter tool 5. At this releasing moment, a strong air jet is jetted for cleaning the main shaft 1 and the cutters thereby the cutter releasing mission is completed by the downward 15 mm long stroke of the piston 23. After replacement cutter tool 5 is attached to the main shaft 1, the compressed air is inputted via the cutter clamping air blow head 221 so as to actuate the disc spring 13 in the main shaft 1 to secure the cutter tool 5 at its initial position through a reversed operation process to releasing operation as described above.

It emerges from the description of the above example that the invention has several noteworthy advantages when compared with any one of the conventional techniques, in particular:

1. Provision of a powerful pressured mechanism makes it possible to impart a great cutter releasing force.
2. Provision of symmetrically arranged two pressured pyramidic blocks serve to alleviate unbalanced momentum of the tool machine during high speed operation.
3. Provision of the two pressured pyramidic blocks for the pressured mechanism serves to form well fitted air blow passages.
4. The pressured mechanism and the floating mount cutter base can with stand a powerful cutter releasing force.

Those who are skilled in the art will readily perceive how to modify the invention. Therefore, the appended claims are to be construed to cover all equivalent structures which fall within the true scope and spirit of the invention.

What is claimed is:

1. A cutter releasing mechanism for a direct connected spindle of a machine tool comprising:

a main shaft directly coupled to the shaft of a driving motor with a shaft coupler;

a cutter releasing oil container enclosing over said main shaft and further including: an oil container base; an oil container lid having a cutter clamping air blow head, a cutter releasing oil pressure head, and an air blow head all being equipped outside of said oil container lid, said cutter clamping air blow head and said cutter releasing oil pressure head being respectively connected to a cutter releasing air blow passage and an oil pressure passage both formed in said oil container, a cutter releasing oil container piston being fitted in said oil container under said oil container lid and being equipped with another air blow passage connected with said air blow head equipped external of said oil container lid;

a floating mount cutter base having a plurality of brake trunk of said floating mount cutter base, thereof, said trunk being bolted to said oil container base with several pairs of screw bolts and nuts, a compressed spring being fitted onto each of said bolts;

a fixing nut screwed onto said main shaft and also engaged with said floating mount cutter base;

a pull rod passing longitudinally through said main shaft and gripping a cutter tool at its lower end thereof;

a pressured mechanism further including two pressured pyramidic blocks; and at least one adjusting washer interposed between said floating mount cutter base and said oil container lid for adjusting number of cutters for the cutter tool.

2. The cutter releasing mechanism of claim 1, wherein said compressed spring is installed between the unthreaded portion of said screw bolt bolting the trunk of said floating mount cutter base to said oil container and its bolt head.

3. The cutter releasing mechanism of claim 1, wherein each of said two pressured pyramidic blocks of said pressured mechanism is conjoined to the circumference of said pull rod with its one end facing symmetrically with the other one, while the other end is emerged out of said main shaft.

4. The cutter releasing mechanism of claim 1, wherein each of said pressured pyramidic blocks is further provided with an air blow communicating with both ends of each said pressured pyramidic blocks, said air blow passage is also communicating with the air blow passage formed in said piston, besides, a conical guide portion is formed at the upper part of each pressured pyramidic block, each conical guide protion has an upper pressure ring at its upper part, while its lower part is engaged to a lower pressure ring with a fixing screw which also is used to secure said two pressured pyramidic blocks onto said pull rod, on the other hand, said upper and said lower pressure rings and said two pressured pyramidic blocks are mutually tightened by means of an engagement nut which being screwed onto said pull rod.

5. The cutter releasing mechanism of claim 1, wherein said unthreaded portion of said screw bolt for engaging said floating mount cutter base with said oil container base is situated at the brake section of said floating mount cutter base.

6. The cutter releasing mechanism of claim 1, wherein the total thickness of said at least one adjusting washer is equal to the maximum stroke of said oil container piston.

* * * * *